United States Patent Office 2,856,638
Patented Oct. 21, 1958

2,856,638

PROCESS FOR THE AFTER-TREATMENT OF POLYMERIC ARTICLES

Roger M. Schulken, Jr., Wilbur I. Kaye, John W. Tamblyn, and Harmon Long, Kingsport, Tenn., assignors to Eastman Kodak Company, Rochester, N. Y., a corporation of New Jersey No Drawing. Application July 20, 1954
Serial No. 444,656

6 Claims. (Cl. 18—48)

This invention relates to a process for the after-treatment of polymeric articles. More particularly this invention concerns a process for the after-treatment of articles such as films and fibers which have been formed from high polymeric materials for rendering the formed articles more stable.

In recent years considerable activity has been directed to the manufacture of formed articles from materials, herein generically referred to as "high polymers." For example, there are presently manufactured fibers, films and the like from high polymeric materials of which so-called polyester material is illustrative. One high polymeric material of alleged European origin may be designated generically as the reaction product of a polyhydric alcohol or glycol with an aromatic acid. A specific illustration of such material is polyethylene glycol terephthalate. There are a number of other high polymeric materials to which the present invention applies, the foregoing reference to the terephthalate merely being for the purposes of background description.

In fabricating such polymeric materials into articles, as for example in preparing fibers, the material in the form of flakes or other particles, are melted under certain conditions and extruded or otherwise forced through forming members to produce the article, such as fiber. In making film the materials may likewise be melted and forced through a die to form the film.

The products as first formed may be quenched and in their initially formed amorphous condition may be relatively weak, opaque and otherwise not especially suitable for use. Hence, such initially formed articles are subjected to drawing, rolling, calendering or tensioning which elongates the fibers or films up to several hundred percent. In the case of sheet or film it may be desirable to elongate the product not only up to several hundred percent lengthwise but also up to several hundred percent across the width of the sheet.

While such treatment, which we will refer to herein as "stretching," improves the strength and other properties of the product, the stretched product contains very powerful internal stresses. Accordingly in subsequent treatment or fabrication, depending upon the temperature and the like other conditions used during such further processing, the material, because of the internal stresses and the like, might deform. Therefore it has been customary in many instances to hold the sheets or filaments under tension or in a fixed manner to prevent their shrinkage during the application of certain further process steps. It is apparent that, for example in the instance of a large sheet, there is a considerable problem in holding such sheet uniformly around all edges thereof, particularly when it is attempted to apply further processing steps to the sheet thus held. It has also been proposed to subject formed articles of the class described to treatment such as so-called hot water setting or even treatments with various acids.

It is, therefore, apparent that the provision of a simple, effective way of after-treating such formed articles to render them more dimensionally stable and otherwise improve their properties represents a highly desirable result. After investigation and experimentation we have discovered a method whereby such stretched products may be simply, efficiently and rapidly treated to improve them.

This invention has for one object to provide a process for treating high polymeric materials for imparting greater stability thereto. A particular object is to provide a process for after-treating stretched, formed articles made from polyester compositions. Still another object is to provide a method for the after-treatment of stretched films and fibers for rendering such products more dimensionally stable. Another object is to provide a method of treating formed polymeric articles involving a short vapor or liquid treatment or both. Still another object is to produce relatively dimensionally stable formed polymeric articles. Other objects will appear hereinafter.

As already discussed above, polymeric materials formed and stretched as is customary in the art, contain powerful internal stresses. Such stresses tend to cause the formed article to return to its original dimensions if, for example, the formed article is either in further processing or in use subjected to heat and its change is unrestrained. As already discussed, restraining such change by clamping the formed article into a holder such as clamping film in a frame to keep it from changing in dimensions during further processing, is disadvantageous in some respects.

In the broader aspects of our invention we have found that the formed article, after having been oriented (stretched) in one or more directions, and while in the stretched state, can be subjected to a short treatment in the vapors or atmospheres of certain chemicals. Such treatment, so to speak, seems to lock the crystal formation in the stretched article. This locking is sufficient so that the article thus treated may be further treated in the normal manner without substantial deformation.

As will be described in detail hereinafter, in accordance with the preferred operation of our invention, after the first brief treatment in the chemical vapors as aforesaid, the article is then preferably subjected to another brief chemical treatment in a chemical bath. As a result of this vapor treatment followed by the chemical bath treatment, the stretched article, such as a stretched fiber or sheet, not only is, so to speak, rendered relatively dimensionally stable, but in the case of sheeting where it is desired to have a stable, transparent sheet, treatment in accordance with our invention tends to eliminate haze due to the former amorphous condition of the resin. In further detail, it has been found that certain chemical liquids of an organic nature apparently accelerate the crystallization of the formed polymeric materials as aforementioned. Such acceleration of the crystal formation, with the chemicals in accordance with this invention, may be caused to occur at room temperature and below. We have observed that a two-way stretched 5 mil thick film of polyester composition, when dipped into a hot acetone for a short time was resistant to shrinkage on further heating. However, the film was of a white color. We further found that if this same film were first subjected to treatment for a short time in acetone vapors and then the vapor-treated film put into the acetone bath, no milkiness or whiteness was present in the sheet, but a transparent sheet was obtained. Other chemicals such as methylene chloride and certain others, as will be described hereinafter, may likewise be used.

While we do not wish to be bound by any theory of operation respecting why treatment in accordance with this invention not only minimizes shrinkage, distortion and the like, and also enables the obtaining of clearer, relatively haze-free products, the following discussion may have a bearing on the functioning of our process.

Stretched products treated by the short vapor treatment in accordance with this invention apparently may promote immediate crystallization on the surface of the article, according to our density and X-ray measurements. Thus, considering a product such as a sheet or film, such treatment may crystallize the outer surface thereof in a manner which may be regarded as acting as a clamp or a pair of rigid plates which prevent the shrinkage of the inner portion. This was further apparent in that thin sheets or films of about 0.3 mil thickness may be substantially completely crystallized by the suitable vapor treatment in accordance with the present invention without following the vapor treatment with a liquid treatment. However, even when using less active chemical liquids on thin sheets or films or the like thin stretched, formed products, the product may be crystallized without the development of much haze. Hence, in accordance with the present invention it is possible on certain stretched products, so to speak to stabilize them dimensionally by exposure to vapors only. However, as will be seen from the description which follows, in many instances we prefer to apply both a vapor and a liquid bath treatment for best results.

Thus in actual practice a continuous two-way stretched film would be set on rollers to run first into a chamber to be exposed on both sides to the vapors of a liquid such as methylene chloride for about 15 seconds. It would then pass into a methylene chloride bath for about 156–60 seconds and then into an oven at 150° C. for 30–60 seconds. It would then be completely heat set without resorting to a complicated machine for clamping the edges of the film. This is particularly important for fast through-put in production of film.

A further refinement of the above technique may be brought about by use of a second bath. For instance, the above treatment on some compositions gives a slight haze caused by surface irregularities which might act as a "tooth" for a subbing layer for photographic films. This subbing would then eliminate the haze. However, in some cases the haze may be objectionable. It may be essentially eliminated by giving the film a treatment in a less active vapor and liquid such as acetone before the treatment with methylene chloride.

In regard to the chemicals which may be used in carrying out our invention, as will be discussed in detail hereinafter, there are several which function, but some of them vary in their rates and the temperatures at which they act best. Accordingly, we prefer in general to use methylene chloride and acetone, although, as just indicated, certain other chemical liquids which likewise may be used, will be discussed. The properties of the liquids which are useful in our invention may be generically described along the following lines. It appears a liquid with a high penetrating power for the particular polymeric material being treated, without actually dissolving the material, is one desirable property for the liquid. In addition, the liquid should swell the polymeric material only a small amount. Thus, our preferred liquids have a solvent power for the polymer at an optimum point intermediate between that of a good solvent and a non-solvent. In addition, it is also desirable that the chemical have a certain lubricity for facilitating the change of the polymer molecules from an amorphous or simple oriented configuration, into a crystalline state.

In regard to the polymeric materials which may be beneficially subjected to the treatment of the present invention for rendering the formed articles more dimensionally stable as indicated above, there are a number of such materials. The polyester of the type polyethylene glycol terephthalate has already been referred to. There are a number of other polymeric materials which will be described hereinafter in detail, particularly in the examples. While some of these polymeric materials differ in their susceptibility to the treatment in accordance with the present invention, we have found that our process may be adapted to take care of any such variations. That is, one factor we have noted is the tendency of the treatment required to parallel the softening temperature of the polymer. Low softening polymers are somewhat easier to treat in accordance with the present invention than higher softening ones. For instance, as will be apparent from the examples hereinafter set forth, a sulfonic acid polymer in which 17 mol percent of succinic acid is substituted for the sulfone acid produces a polymeric material which may readily be treated by the present invention. Or, if the polymer is plasticized, as for example by the addition of 5% tripheny phisphite plasticizer, the treatment is facilitated. For example, a 5 mil polymer film which contains plasticizer as just mentioned, is readily crystallized on its surface by acetone at room temperatures. This surface crystallization produced in accordance with the present invention is sufficient to prevent shrinkage even at 150° C. The plasticizer also facilitates the removal of any last traces of haze from the film by vapor and liquid bath treatments.

A particular advantage to this invention is that it permits the crystallization or "setting" of polyesters which are not susceptible to treatment by other means such as by heat. For instance, certain high melting polyesters cannot be crystallized by heating. Actually, heat may remove the crystallinity in some cases. Examples of such polyesters are those formed by reacting the before mentioned sulfone acid with 2,2-dimethyl propanediol or by reacting equimolar amounts of this acid and terephthalic acid with ethylene glycol. These polyesters may be crystallized or "set" by acetone, methylene chloride, or other suitable liquid as described above.

Thus, in summary it may be stated that the process of the present invention in its application to a variety of high polymeric formed products, takes into consideration the following factors:

(1) Crystallization activity of the liquid or vapor,
(2) Susceptibility to treatment of the high polymer article acted upon,
(3) Temperature,
(4) Time of treatment, and
(5) Thickness of film or fiber (thickness of crystallized layer desired).

Expressed in another manner, if, for example, it were desired to treat a two-way stretched film of a certain high polymer material of a specified thickness in as short a time as possible, then a relatively high activity chemical might be selected. However, too active a chemical might overtenderize the film undergoing treatment. Therefore, the activity of such a liquid may be further controlled by modification of the temperature. It is, therefore, apparent from the foregoing that by the proper correlation of the choice of the chemical, the temperature and time of treatment and the like, a control of conditions and results in accordance with the present invention may be obtained. Also by suitable choice of the various factors as discussed, it is possible to adapt the process of the present invention to the treatment of a wide variety of high polymers and a wide variety of formed articles.

In addition to the beneficial result, so to speak, of dimensionally stabilizing the formed article, which improvement has been described above, various other benefits are obtained by the treatment in accordance with the present invention. For example, considering a film or fiber treated by the present invention, the surface thereof is improved in a manner so that there is less tendency of attenuated products to stick together or to other materials. That is, film or fibers properly processed in accordance with the present invention may be rolled up on spools or rolls and while on the spools or rolls subjected to further processing, including process steps involving heat, without the material which has been treated in accordance with the present invention sticking. Without the treatment of the present invention such further treatment involving subjecting the formed articles to heating would have presented a problem of the sheets or films sticking together.

Another advantage of the present invention is that the formed product after being removed from the bath treatment, and if desired given a heating or drying treatment, is more flexible. The flexible product such as a flexible sheet may then be given further processing such as creasing, folding, pleating, or in the case of fibers, crimping, creping or twisting. Finally the further processed articles can be subjected to relatively high heat for setting the final product. Still further understanding of our invention will be had from a consideration of the examples which follow and which are set forth primarily for illustrating certain preferred embodiments of our invention.

*Example I*

A sample of clear, 5-mil thick, two-way stretched film made from a polyester of p,p'-dicarboxy diphenyl sulfone and pentanediol with 5% triphenyl phosphite was dipped in acetone for 30 seconds. When removed it was milky white, but it could be placed in boiling water or heated to 150° C. in air for several minutes without appreciable shrinkage. The density of the film did not change until after heating. A similar film which had not been treated with acetone, when placed in boiling water, immediately shrank to ⅓ its dimensions in each direction in the plane of the film. Also a similar film when pretreated for 15 seconds in the acetone vapor before immersing in the liquid, had the same properties as the previous acetone dipped film but it was clear and free from haze.

*Example II*

A sample of film similar to the above except that it contained no triphenyl phosphite was treated as above. The treatment had no effect on the film. This type film was then treated with boiling acetone and the film became resistant to shrinkage as in the case of Example I. A sample of this film was treated with methylene chloride at room temperature. The results were again the same as in Example I.

*Example III*

A film similar to that of Example II except that it was 0.3-mil thick, was treated with methylene chloride vapor and liquid. This film was rendered resistant to shrinkage at high temperatures. However, it was noted the density of the film approached that of a heat-set or crystallized resin. The film was also somewhat tender. A similar film was treated with acetone vapor then liquid. It was also rendered resistant to shrinkage but without becoming tender.

*Example IV*

A film similar to that used in Example II was exposed to saturated vapors of methylene chloride for three minutes. This treatment rendered the film resistant to shrinkage at high temperatures.

*Example V*

A film similar to that used in Example II was treated for 15 seconds in methylene chloride vapor, then 30 seconds in the liquid. It was then heated to 150° C. in air for one minute. This rendered the film completely dimensionally stable in boiling water and to air temperatures up to 175° C. or above. The film was quite tough and flexible and suitable for packaging or for a photographic film base.

*Example VI*

A film similar to that used in Example II was bent to a desired shape (a small box) and clamped into place. It was then treated with methylene chloride vapor then liquid. After removing the liquid and drying the resin, the clamps could be removed and the box remained in shape. It could then be made more shape stable by heat setting in air at 150° for one minute.

*Example VII*

Two films similar to that used in Example III were heated in contact with each other at 100° C. The films had a tendency to stick together or block. This resulted in unevenness in the film. A similar experiment was made on two films that had been previously treated with methylene chloride vapor for one minute. These films showed no tendency to stick together.

*Example VIII*

A film similar to that used in Example II was treated with methylene chloride vapor and then with the liquid. In addition to its greater thermal dimensional stability and reduced tendency to stick, it was found to be considerably more flexible. The untreated film was stiff and on flexing gave a metallic ring, whereas the treated film had a sort of leathery flexibility with no metallic sound. After the liquid evaporated, the stiffness returned. However, if the methylene chloride was replaced by a higher boiling material such as tetrachloroethane, the effect is prolonged. This film was unique in that it had dimensional and thermal stability, a high sticking temperature, and yet it was soft and flexible.

*Example IX*

A polyester of composition of Example I was extruded from a suitable machine in the form of a long ribbon about 4 inches wide and 20–30 mils thick. It was then stretched in the direction of extrusion and then perpendicular to this direction. The film was then run over rollers into a chamber containing methylene chloride vapor and then into the liquid in such a way that the vapor treatment lasted 15 seconds and the liquid treatment lasted 30 seconds. The film then passed into an oven at 150° C. Thus the film was continuously stretched and crystallized to a tough, thermally stable film.

*Example X*

A yarn spun from polyethylene terephthalate was tightly wound around a small wire. It was treated with methylene chloride vapor 15 seconds, then liquid for 15 seconds. It was then dried and removed from the wire. The curl imparted by the wire was set into the yarn to give a crimped effect. This curl or crimp was not removed by stretching or by immersing for ten minutes in warm water. A yarn spun from composition of Example I above was crimped in a similar manner. Acetone had a similar effect on the two yarns.

It is apparent from the above examples that our invention functions to improve the conventional high polymeric materials such as polyethylene glycol terephthalate. It is also apparent our invention likewise functions to improve in the several ways described, other polymeric materials such as those obtained from the reaction of dicarboxy diphenyl sulfone with diols. Our invention functions on high polymers either where the polymeric material is comprised substantially exclusively of the polyester or where a portion of the aromatic acid component going to make up the polymer has been replaced by other acids. These replacement acids are illustrated particularly by aliphatic dibasic acids such as succinic, azelaic and a number of others.

Therefore, in the broader aspects of our invention our new process of after-treating formed, oriented articles may be regarded as applying to high polymer articles in general, and in particular to the terephthalate-type polymer, the sulfone-type polymer, and others. The exact manner of making the high polymer is not a limitation on the present invention. The high polymers may be obtained from the reaction of aromatic acid with polyhydroxy compounds, the polyhydroxy component being obtained either directly or indirectly through the use of aliphatic esters.

Other examples of high polymeric materials are as follows:

(a) The reaction product of 83 mole percent of p,p'-dicarboxydiphenyl sulfone and 17 mole percent succinic acid with pentanediol.

(b) The reaction products where the succinic acid of (a) above is replaced with sebacic acid, adipic acid, azelaic acid, terephthalic acid, o-phthalic acid, or isophthalic acid.

(c) The reaction products where the pentanediol of (a) above is replaced by butanediol, propanediol, ethylene glycol, 2,2-dimethylpropanediol, or 2-methylbutanediol.

(d) The reaction products of equimolar amounts of the above-mentioned sulfone acid and terephthalic acid with ethylene glycol.

(e) Reaction products of combinations of (b) and (c) above.

(f) Reaction products of similar modifications of polyethylene terephthalate.

Therefore, from the foregoing description it will be apparent that we use the term "high polymer" to generically embrace any or all of the foregoing types of compound. The terms "polyester type," "sulfone type," etc., are used to embrace the particular class of polymeric material identified above.

While in the foregoing examples we have referred to plasticization with triphenyl phosphite, other plasticizers may be used. For example, some of these other plasticizers are as follows: dibutyl sebacate, γ-valerolactone, tetraisobutyldiphenyl ether, dimethyl phthalate, 2,2-bis(p', hydroxyphenyl) propane, 2,6 - ditertiary - butyl - 4-methylphenol,N - ethyl - p - toluenesulfonamide, diphenyl phenylphosphinate, di-2-ethylhexyl maleate, and the dibutyl ester of p,p'-dicarboxydiphenyl sulfone.

In general any amount of plasticizer up to about 25% may be employed, depending upon the type of product and its ultimate intended use.

As further apparent from the preceding description, in accordance with our preferred embodiment, we treat the formed, oriented article of high polymer with both vapor and liquid. In general the length of the treatment is relatively short. For example, the fluid treatment with vapor may be from about 10 seconds to 5 or 6 minutes, depending upon the activity of the fluid used, the temperature of treatment and the like factors. Likewise, the fluid treatment with the chemical bath may vary from a few seconds to several minutes, also depending on such factors as the activity of the fluid used, susceptibility of the resin to treatment, temperature of the treatment and the like factors.

The treatment of films and fibers has been discussed in some detail as they are particularly illustrative types of formed articles. However, our invention contemplates wider applications and ultimate use of the treated materials. For example, films treated in accordance with the present invention may be used for photographic film base or for thin sheets useful in the packaging industry, artificial leather, shower curtains, upholstering, etc. Our process is also of use in preparing different types of textile materials from the various high polymers treated in accordance with the present invention. That is, our invention can be used in conjunction with procedures involving crimping, setting creases in pleats, etc., as well as utilized in treating various types of high polymer yarn to make it resistant to shrinkage when subjected to high temperature conditions.

We claim:

1. A process of improving a formed article formed from polymeric materials obtained from the reaction of a dicarboxy diphenyl sulfone and a diol, which comprises fabricating the polymeric material into the desired form of article, orienting the article by tension and subjecting the oriented article to treatment for a brief period with vapors essentially consisting of methylene chloride.

2. A process of improving a formed article formed from polymeric materials essentially consisting of polyesters, which comprises fabricating said polymeric materials into the desired form of article, subjecting the formed article to orientation treatment and thereafter subjecting the oriented article to treatment for a brief period with vapors essentially consisting of acetone.

3. A process of improving a formed sheet formed from a high polymeric material of the reaction product of a hydroxy compound and an aromatic acid, which comprises subjecting said polymeric sheet to stretching, and thereafter subjecting the stretched sheet to treatment for a brief period with vapors essentially consisting of methylene chloride.

4. A process for improving a formed article formed from a high polymer obtained by the reaction of a hydroxy compound and an aromatic acid, which comprises fabricating the polymeric material into the desired form of article, orienting the article by tension and subjecting the oriented article to treatment for a brief period with vapors essentially comprised of an organic chemical having a high penetrating power for the polymer without dissolving the polymer from the group consisting of acetone and methylene chloride, which vapors impart lubricity to the polymer molecules to facilitate and change from an amorphous to a crystalline form.

5. A process which comprises forming an attenuated article from a high polymer obtained by the reacting of a hydroxy compound and an aromatic acid, subjecting the formed article to stretching for the orientation thereof, then conducting the stretched article to treatment comprising the exposure of the article for a period between 10 seconds and 6 minutes in the vapors of an organic chemical from the group consisting of acetone and methylene chloride, then subjecting the vapor treated article to treatment from a few seconds' duration to several minutes' duration in a liquid bath of a chemical of the same kind, withdrawing the treated article from the liquid bath and removing external chemical liquid from the article before winding up the article.

6. A process of improving a formed article formed from a high polymeric material obtained from the reacting of a hydroxy compound and an aromatic acid, which comprises subjecting said formed article to stretching, and thereafter subjecting the stretched article to treatment for 10 seconds to 6 minutes with an organic chemical from the group consisting of acetone and methylene chloride.

References Cited in the file of this patent

UNITED STATES PATENTS

| | | |
|---|---|---|
| 2,556,295 | Pace | June 12, 1951 |
| 2,578,899 | Pace | Dec. 18, 1951 |
| 2,597,557 | Amborski | May 20, 1952 |

UNITED STATES PATENT OFFICE
CERTIFICATE OF CORRECTION

Patent No. 2,856,638            October 21, 1958

Roger M. Schulken, Jr., et al.

It is hereby certified that error appears in the printed specification of the above numbered patent requiring correction and that the said Letters Patent should read as corrected below.

Column 3, line 29, for "156-60" read -- 15-60 --; line 31, for "withuot" read -- without --; column 4, line 8, for "sulfonic" read -- sulfone --; line 12, for "phisphite" read -- phosphite --.

Signed and sealed this 27th day of January 1959.

(SEAL)
Attest:

KARL H. AXLINE            ROBERT C. WATSON
Attesting Officer            Commissioner of Patents